(12) United States Patent
Fink et al.

(10) Patent No.: US 11,093,635 B2
(45) Date of Patent: Aug. 17, 2021

(54) APPARATUS AND METHOD FOR PRIVATE INFORMATION RETRIEVAL

(71) Applicant: The Johns Hopkins University, Baltimore, MD (US)

(72) Inventors: Russell A. Fink, Laurel, MD (US); David R. Zaret, Columbia, MD (US); Rachel B. Stonehirsch, Silver Spring, MD (US); Robert M. Seng, Silver Spring, MD (US); Samantha M. Tyson, Annapolis, MD (US)

(73) Assignee: The Johns Hopkins University, Baltimore, MD (US)

(*) Notice: Subject to any disclaimer, the term of this patent is extended or adjusted under 35 U.S.C. 154(b) by 457 days.

(21) Appl. No.: 15/586,892

(22) Filed: May 4, 2017

(65) Prior Publication Data

US 2017/0323118 A1 Nov. 9, 2017

Related U.S. Application Data

(60) Provisional application No. 62/332,136, filed on May 5, 2016.

(51) Int. Cl.
| | |
|---|---|
| *G06F 21/62* | (2013.01) |
| *G06F 16/2457* | (2019.01) |
| *G06F 16/9535* | (2019.01) |
| *H04L 9/00* | (2006.01) |

(52) U.S. Cl.
CPC ...... *G06F 21/6245* (2013.01); *G06F 16/2457* (2019.01); *G06F 16/9535* (2019.01); *G06F 21/6227* (2013.01); *H04L 9/008* (2013.01); *H04L 9/006* (2013.01)

(58) Field of Classification Search
CPC ............ G06F 16/9535; G06F 16/9024; G06F 16/3344; G06F 16/337; G06F 21/6245; G06F 21/6227; G06F 16/2457; G06F 21/60; G06F 12/1408; G06Q 30/0627; G06Q 50/16; H04L 9/008; H04L 9/006
See application file for complete search history.

(56) References Cited

U.S. PATENT DOCUMENTS

| | | | |
|---|---|---|---|
| 6,785,424 B1 * | 8/2004 | Sakamoto | H04N 1/41 358/1.15 |
| 7,240,048 B2 * | 7/2007 | Pontius | G06F 16/90339 704/243 |
| 8,566,601 B1 * | 10/2013 | Waters | H04L 9/3073 713/182 |
| 2005/0228791 A1 * | 10/2005 | Thusoo | G06F 16/8365 |

(Continued)

*Primary Examiner* — Mariela Reyes
*Assistant Examiner* — Fatima P Mina
(74) *Attorney, Agent, or Firm* — Sung T. Kim

(57) ABSTRACT

Apparatuses and methods for private information retrieval are provided. One example method may include receiving a query state machine that is an encoding of a search pattern. The query state machine may include a plurality of states and a transition function that defines a plurality of transitions based on the search pattern. The example method may also include performing a private query against a target query string of a target query record by applying the query state machine to the target query string to develop a private encoding. The method may further include transmitting query results based on the private encoding.

20 Claims, 8 Drawing Sheets

(56) References Cited

U.S. PATENT DOCUMENTS

| | | | |
|---|---|---|---|
| 2006/0161404 A1* | 7/2006 | Campbell | G06F 11/3688 703/2 |
| 2008/0028281 A1* | 1/2008 | Miyazaki | H03M 13/1102 714/776 |
| 2008/0263665 A1* | 10/2008 | Ma | G06F 21/552 726/23 |
| 2011/0137942 A1* | 6/2011 | Yan | G06F 16/24568 707/780 |
| 2015/0016536 A1* | 1/2015 | Hsieh | H04N 19/137 375/240.18 |
| 2016/0149866 A1* | 5/2016 | Dolev | H04L 9/008 726/30 |
| 2016/0283728 A1* | 9/2016 | Antonopoulos | H04L 9/008 |
| 2017/0111330 A1* | 4/2017 | Mosko | H04L 9/00 |

* cited by examiner

APPARATUS AND METHOD FOR PRIVATE INFORMATION RETRIEVAL

CROSS-REFERENCE TO RELATED APPLICATIONS

This application claims the benefit of U.S. Provisional Application No. 62/332,136 filed on May 5, 2016, the entire contents of which are hereby incorporated herein by reference.

TECHNICAL FIELD

Example embodiments generally relate to information retrieval and, more particularly, relate to information retrieval with query privacy.

BACKGROUND

The amount of information that is available, for example, via the Internet continues to increase at an accelerating pace. Being able to access data via networks such as the Internet through searches and queries continues to be an important area for innovation, particularly in situations where privacy of the queries and the results are a concern. As such, not only is the efficiency with which queries can retrieve data becoming increasingly important, but so too are aspects of query privacy.

BRIEF SUMMARY OF SOME EXAMPLES

Apparatuses and methods for private information retrieval are provided. An example method may comprise receiving at a data repository computer system, a query state machine from a data requesting computer system. The query state machine may be an encoding of a search pattern and the query state machine may include a plurality of states and a transition function that defines a plurality of transitions based on the search pattern. The plurality of states may include an initial state and one or more accepting states, and each transition of the transition function may indicate (a) a next state based on an input symbol and (b) a private filter value for the next state based on whether the next state is an accepting state or a non-accepting state. The example method may also include performing a private query against a target query string of a target query record in the data repository computer system by applying the query state machine to the target query string. Applying the query state machine to the target query string may comprise generating a private encoding using a private filter value of a final state of the query state machine for the target query string. The final state may be determined by a traversal through the query state machine based on the target query string. The private encoding may be based on target data retrieved from the target query record in response to the final state being an accepting state. The example method may further include transmitting query results based on the private encoding.

An apparatus for performing private information retrieval is also provided. The example apparatus may be a data repository computer system comprising at least one processor and at least one memory. The at least one processor, using the at least one memory, may be configured to receive a query state machine from a data requesting computer system, wherein the query state machine is an encoding of a search pattern. The query state machine includes a plurality of states and a transition function that defines a plurality of transitions based on the search pattern. The plurality of states may include an initial state and one or more accepting states, and each transition of the transition function may indicate (a) a next state based on an input symbol and (b) a private filter value for the next state based on whether the next state is an accepting state or a non-accepting state. The at least one processor may also be configured to perform a private query against a target query string of a target query record in the data repository computer system by applying the query state machine to the target query string. In this regard, being configured to apply the query state machine may comprise being configured to generate a private encoding using a private filter value of a final state of the query state machine for the target query string. The final state may be determined by a traversal through the query state machine based on the target query string and the private encoding may be based on target data retrieved from the target query record in response to the final state being an accepting state. The at least one processor may be further configured to transmit query results based on the private encoding.

Another example method for private information retrieval may be provided. In this regard, the example method may comprise receiving, at a data repository computer system, a query state machine from a data requesting computer system. The query state machine may be an encoding of a search pattern provided to the data requesting computer system. In this regard, the search pattern may be provided to the data requesting computer system by a data requesting entity to search for and retrieve data at the data repository computer system in a manner that maintains privacy of the search pattern. The query state machine may include a plurality of states and a transition function that defines a plurality of transitions based on the search pattern. The plurality of states may include an initial state and one or more accepting states, and each transition may indicate (a) a next state based on an input symbol and (b) a private filter value for the next state based on whether the next state is an accepting state or a non-accepting state.

The example method may comprise performing a private query against a target query string of a target query record in the data repository computer system by applying the query state machine to the target query string. In this regard, applying the query state machine to the target query string may comprise sequentially inputting subsequent symbols of the target query string into the transition function to determine a next query state, inputting a last symbol of the target query string into the transition function to determine a final state of the query state machine for the target query string and to obtain a private filter value for the final state, generating a private encoding based on the private filter value of the final state, wherein the private encoding is based on target data retrieved from the target query record in response to the private filter value indicating that the final state is an accepting state, and combining the private encoding in a query results buffer with previous private encodings. Further, the example method may comprise transmitting the query results buffer to the data requesting computer system for decrypting the query results buffer, at the data requesting computer system, to retrieve any target data of a target query record that has been included in a private encoding.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1A:
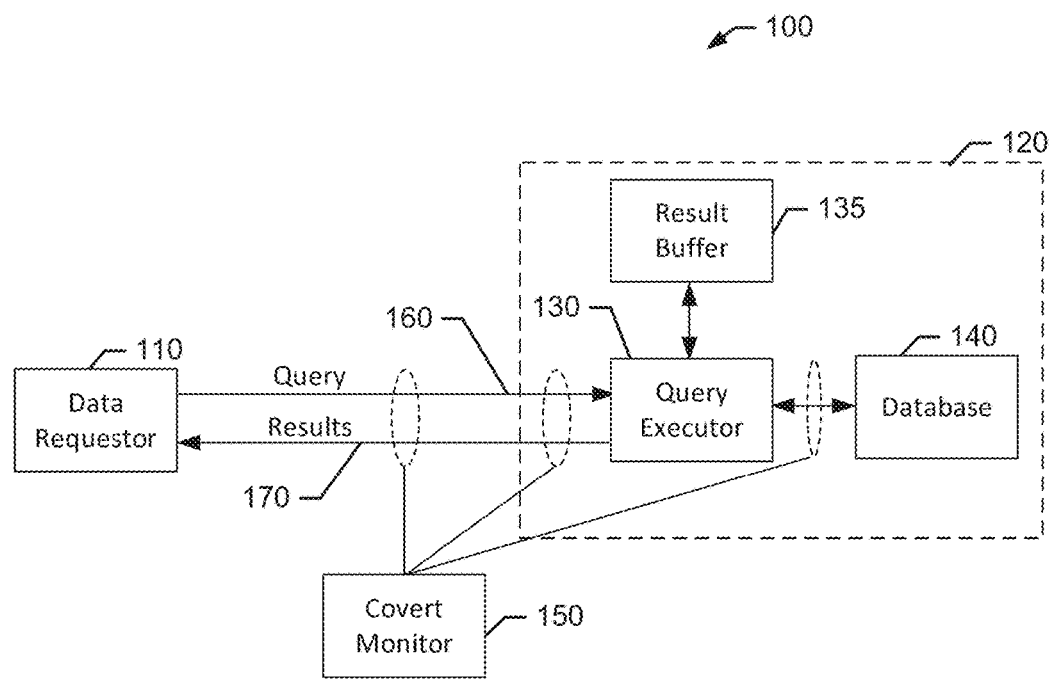
FIG. 1A shows a block diagram of a system of interconnected components for performing a private query search according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

According to various example embodiments, example techniques and devices for performing private information retrieval are provided. In this regard, there is an increasing need for the ability to privately search for and retrieve data from data repositories that may be monitored and maintained by entities that may not be trusted, at least to some degree. The term private as used herein is used in association with data or a technique that is not known to an entity, even if that entity is operating using the technique or has access to the data. In many circumstances, the content of query requests themselves may include sensitive information that should not be disclosed to an untrusted entity. In this regard, the query terms may be used and stored by the entity executing the query for purposes not known to, desired by, or authorized by the entity requesting the results. For example, an untrusted query executor may analyze query terms for tracking purposes, discovering proprietary information, revealing proxy identities, or the like.

According to some example embodiments, the techniques described herein operate to permit a data requestor to transmit a query to a data repository, perform the query at the data repository, and receive query results while maintaining the privacy of the query content and the retrieved results with respect to, for example, the query executor. In this regard, example techniques involve encoding a search pattern into a query state machine and transmitting the query state machine to the data repository for execution as a private query. According to some example embodiments, a query state machine may be based on a type of finite automaton that is a model of computation employing multiple states and transitions between the states to thereby permit navigation through some or all of the states to reach a final state and an associated result for a given computation. Based on the final state, a transition function of the query state machine, which defines certain states as accepting states and other states as non-accepting states, may return a result for a given computation based on whether a computation ends at a final state that is an accepting state or a non-accepting state. According to some example embodiments, if the final state of a computation is an accepting state, then, for example, a first result may be returned. If, however, the computation ends at a state that is not defined as an accepting state (i.e., a non-accepting state), then a second, different result may be returned.

The data repository, being familiar with how to perform computations using such a query state machine, may be configured to apply the query state machine to its data to perform the query, without being able interpret the underlying search string or pattern or analyze the returned results. Further, example techniques may maintain query and result privacy, while also limiting the use of network or communication bandwidth.

FIG. 1A shows an example system 100 in which such private queries, according to some example embodiments, may be submitted and results returned. In this regard, the entities involved may be a data requestor 110, possibly in the form of a data requesting computer system, and a data repository 120, which may be embodied as a data repository computer system. The data repository 120 may be comprised of a query executor 130, possibly employed on a computer system that is configured to execute a query as provided by the data requestor 110. The data repository 120 may also include a database 140, which may be, for example, a collection of data records that are stored on memory devices of servers at a physical location with the query executor 130 or at another location (e.g., in the cloud).

The data requestor 110 may submit a query 160, via a network such as the Internet, to the data repository 120 for execution and the query executor 130 may search the database 140 based on the query 160. In this regard, the data requestor 110 may be specially configured to generate a query 160 according to various example embodiments, and query executor 130 may be specifically configured to interpret the query 160 and perform a search and retrieval of data while being unable to decipher the content of the query or the results of the query. Upon completing the query search, the results 170 of the search based on the query 160 may be returned to the data requestor 110. Communications connectivity between the data requestor 110 and the data repository 120 may be via a network, such as, for example, the Internet. As such, in instances where the connection between the data requestor 110 and the data repository 120 is public or otherwise accessible to third parties, one or more covert monitors 150 may be present that monitor or sniff the network for information, such as, for example, query 160 or results 170 to extract information. Additionally or alternatively, covert monitors 150 may monitor or sniff information exchanged within the network or domain of the data repository 120, or even between the query executor 130 and the database 140, which according to some example embodiments may be remote from each other and may communicate via, for example, the Internet.

With this context as a back drop, it can be seen that submitting a query of a plaintext stream of symbols, such as characters, on a public network or to an untrusted data repository 120 may compromise search privacy if conventional non-private techniques are utilized, thereby revealing the interests and motivations of the data requestor 110. Private Information Retrieval (PR) techniques, as described herein, may provide computationally private solutions based on various approaches including, for example, partially homomorphic encryption. Homomorphic encryption may involve techniques that permit a series of computations to be executed in a chain fashion, possibly by a number of sequential services, to form ciphertext, which can be decrypted by performing conjugate computations to arrive back at plaintext. Such techniques may allow a data requestor 110 to search a data repository 120 without revealing the data requestor's 110 search criteria, sacrificing bandwidth, or deploying a trusted device in data repository's 120 domain. Further, with respect to bandwidth, such private queries can be performed without having to download and duplicate the data of the data repository 120 within a trusted domain. As further described herein, such private queries may, according to some example embodiments, be performed by using arbitrary length pattern matching techniques, which may be more flexible than conventional fixed string length approaches. Further, according to some example embodiments, obfuscation techniques may also be employed to increase the privacy profile of example techniques and limit the effectiveness of frequency and graph quotient attacks by, for example, an untrusted data repository 120 or third party covert monitors 150.

Accordingly, it is clear that there is an increasing need to retrieve targeted data from large streams of plaintext in a private manner. Using conventional non-private techniques, organizations in domains such as, for example, defense, research, and healthcare may hesitate to submit queries to open data repositories (e.g., data repository 120), because the queries themselves could leak sensitive information. As an example, the data requestor 110 may fear that querying for specific security indicators in data repository's 120 operational network may leak knowledge of data requestor's 110 indicators to covert monitor 150, who may be an adversary that covertly monitors data repository's 120 network, thereby informing the covert monitor 150 of, for example, ways to avoid detection by data requestor 110 while continuing to hide from data repository 120.

While the data requestor 110 may avoid revealing a query 160 by simply obtaining copies of the database 140, such an approach may create excessive demand on both the data requestor's 110 and the data repository's 120 communication and storage resources. An alternative approach to avoid query detection may be to negotiate with a trusted third party to query the data repository 120 on the data requestor's 110 behalf. However, in this approach, the data requestor 110 may incur privacy risks associated with secure key sharing, and possibly a costly and semi-permanent presence (e.g., the trusted third party) within data repository's 120 domain.

According to some example embodiments, the PIR techniques as described herein may provide data requestor 110 with a way to query privately without sacrificing bandwidth or operational costs. Such approaches may protect data requestor's 110 plaintext searches while allowing data repository 120 visibility and control over the implementation and query state machine operation. As mentioned above, the use of homomorphic encryption and cryptography may produce precise results for data requestor 110 that are hidden from data repository 120 (and covert monitors 150). According to some example embodiments, such systems employing the techniques described herein may assume that data repository 120 is honest (i.e., trusted to perform the private query protocol without omitting or falsifying records) but curious to understand the query parameters and results. As such, data requestor 110 may employ a protocol that achieves privacy without relying on a trusted third party, while maintaining space and communications efficiency.

According to some example embodiments, PIR plaintext systems and methods are provided based on generalized search patterns that employ wildcards over plaintext keywords of unbounded length. The search pattern may be provided to the data requestor 110 by a data requesting entity (e.g., such as a service or an individual) to query data at data repository 120 in a manner that maintains privacy of the search pattern from the data repository 120, while permitting the data repository 120 to perform a query based on the search pattern and return a query result to the data requestor 110. Such a capability with search patterns may be useful or even essential for searching particular data sets (e.g., UNIX grep tools), which would be unavailable using conventional fixed string approaches. According to some example embodiments, regular language-based pattern matching techniques described herein may employ query state machines in the form of Deterministic Finite Automata (DFAs) that encode data requestor's 110 query 160 in private manner. Additionally, according to some example embodiments, obfuscation approaches and algorithms may be used to mitigate, for example, a frequency analysis attack or a graph quotient attack using, for example, Somewhat Homomorphic Encryption (SHE).

The example systems and techniques described herein may have application in a number of settings. For example, such systems and techniques may be leveraged to maintain query privacy while searching streaming data sets in applications such as searching infected domains for sensitive malware indicators, searching financial transaction streams for illegal activity, and searching partner networks for covert communications without revealing information to any resident adversaries.

According to some example embodiments, with respect to a general process for applying a query state machine and providing results, the query executor 130 may first initialize a results buffer B 135 that may be used to combine encoded results from application of the query state machine to each record in the database 140. The results buffer B 135 may be an allocation of memory, for example of a non-transitory memory device, which is set aside to receive query results. The query executor 130 may be configured to receive a query state machine that includes a transition function. The transition function may have various outputs, as described herein, including one of many private filters $C_x$, where each private filter $C_x$ encodes a plaintext value x. According to some example embodiments, the transition function returns a private filter corresponding to, for example, one of two values, namely, $C_1$, for an encryption of one, or $C_0$, for an encryption of zero. In this regard, the query executor may be configured to apply a query state machine to a record to obtain a filter of either $C_1$ or $C_0$. According to some example embodiments, the transition function returns a private filter value of $C_1$ when a match is found in a record that is currently being analyzed, or $C_0$ if the current record is not a match. The results may then be combined in the results buffer B 135, and the results buffer B 135 may be regularly sent to the data requestor 110 for decryption.

More specifically, prior to introducing results data to the results buffer B 135, the query executor 130 may initialize the results buffer B 135 with, for example, a randomized encryption of zero, which is provided by the data requestor 110 with the query 160. Query executor 130 may then apply a query state machine from the query 160 to each data record in the database 140, in a blind fashion, such that query executor 130 neither learns the search pattern nor the result of its application. Homomorphisms may enable query executor 130 to combine pieces of information blindly, resulting in a preservation of matching information, and discarding of non-matching information with no observable difference in computational time or space complexity at the data repository 120. According to some example embodiments, the process of performing the query with respect to each record may involve the performance of a private traversal or computation through states of the query state machine, where the query state machine is developed based on the search pattern. An output of a transition function of the query state machine may be determined that indicates whether a next state of the traversal for a given record is an accepting state of the query state machine (e.g., returning $C_1$) or a non-accepting state of the query state machine (e.g., returning $C_0$). If the traversal results in no match to the search pattern, then the transition function outputs a private filter value of $C_0$ because the traversal ended on a non-accepting state. Accordingly, the appropriate result may be prepared using $C_0$ for output to the results buffer B 135. If, however, the comparison results in a match, then the transition function outputs a private filter value of $C_1$ because the traversal ended on an accepting state. Accordingly, the result may be prepared using $C_1$ for output to the results buffer B 135. Due to the nature of the query state machine, as further discussed below, query executor 130 may not be able to determine if $C_0$ or $C_1$ is being applied for the a given record.

The query executor 130 will therefore, for example, perform a homomorphic operation to filter and encode plaintext V (i.e., the plaintext target data for a given record) by $C_x$, where X=1 for a match and X=0 for a non-match, to obtain $b = C_x \odot V$. In this regard, $x \odot y$ may be, for example, $x^y$ mod $N^2$. Further, the results buffer B 135 may be updated using b via a second homomorphic operation where $B \leftarrow B \otimes b$. In this regard, $x \otimes y$ may be, for example, xy mod $N^2$.

The query executor 130 may then provide the results buffer B to the data requestor 110 for decryption. During decryption, query executor 130 may determine that where $C_1$ is found to determine that a match was encountered and the associated data V can be obtained. However, if only $C_0$ is found in the results buffer B, then no match was found.

According to some example embodiments, the data repository 120, via the query executor 130, may be configured to store the query results in, for example, a fixed size buffer that may be forwarded to data requestor 110 periodically for decryption during the query process. Additionally, the output buffer may be of a fixed size M, thereby resulting in a constant-sized communications cost O(M) to send back the buffer to the data requestor 110.

Figure 1B:
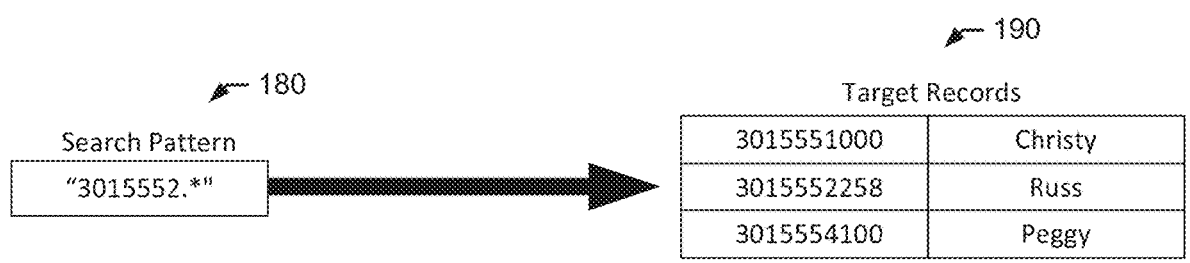
FIG. 1B shows an example search pattern and target records according to an example embodiment.

In consideration of the context provided above and with respect to FIG. 1A, FIG. 1B shows an example search pattern 180, capable of matching target search strings of arbitrary length due to the ".*" wildcard, which indicates that any symbols may follow the "3015552". Database 190 (i.e., a more specific example of the database 140) is an example collection of records that the search pattern 180 may be applied to in order to perform a query. In this regard, the data requestor 110 may provide a query state machine to query executor 130 specifying a search based on a search pattern 180. The query is to determine any person that owns a phone number that matches the search pattern 180 as provided in the database 190. The query state machine may be generated based on the search pattern 180, and the query state machine may be provided as cryptographic material and applied to the database 190.

According to some example embodiments, as the query state machine is applied to each record a private filter value will be returned and applied with the associated data (i.e., the owner's name) to a homomorphic operation. In this regard, since 3015551000 is not a match, then $C_0$ is applied for the "Christy" record. The result is then combined via a second homomorphic operation to update the results buffer. Moving to the next record, since 3015552258 is a match, a transition function of the query state machine returns the filter $C_1$, which is applied using "Russ," and the result is combined via the second homomorphic operation to update the results buffer. Finally, since 3015555300 is not a match, $C_0$ is applied for the "Peggy" record, and the result is again combined via the second homomorphic operation to update the results buffer. The buffer may then be sent to the data requestor 110 for decryption to determine the plaintext data associated with the $C_1$ record and obtain "Russ" as the match to the query.

Having described an example technique for query search results when a match is found, FIGS. 2 through 5 are now provided to describe the example techniques for generating and applying an example query state machine for pattern matching with records of a data set, for example, residing at the data repository 120. In this regard, example data structures and methods of encoding are provided, followed by example techniques for obfuscation to preserve privacy.

According to some example embodiments, a search pattern that may be used to build a query state machine may be a regular expression of symbols. In this regard, a regular expression may be a string of symbols that is a regular language search pattern, where one type of symbol is a character (e.g., a, b, c, 1, 2, 3, etc.). Unlike fixed strings, regular expressions may include symbols with special meanings, such as, for example "*" for zero-or-more repetitions of the preceding symbol, square brackets "[abc]" that indicate choice of any enclosed symbol, and "." that indicates a match with any symbol. A regular expression may be provided as a search pattern for encoding. As such, the search pattern may include wildcard symbols and therefore may match strings that have an arbitrary, unbounded length.

According to some example embodiments, a query state machine may be expressed as a state diagram having a plurality of states and a plurality of transitions that are based on the search pattern. The plurality of states may include an initial or start state and one or more accepting states, as further described below. A transition function may define the transitions, which may link the states and provide for the ability to traverse or compute through the state diagram based on a target query string taken from, for example, the data repository 120. Additionally, according to some example embodiments, the transitions may indicate a private filter value associated with whether the next state for the transition is an accepting state or non-accepting state.

According to some example embodiments, the query state machine may be built on features of a Deterministic Finite Automaton (DFA) D. A DFA may be structure in the form of a finite-state machine that may accept or reject strings of symbols. In this regard, a DFA D may be expressed as D=<T, $\langle T, \Sigma, \delta, t_0, F\rangle$, where T is a finite set of states, $\Sigma$ is a set of input symbols (e.g., a target query string), $\delta$: $T \times \Sigma \rightarrow T$ is the transition function which returns a new state based on a current state and a next observed symbol from the set of input symbols, $t_0 \in T$ is the initial state, and $F \subseteq T$ are accepting states. In this regard, a DFA may be executed by processing input symbols of an input string (e.g., a target query string from a selected record) one at a time and updating the current state (or cursor) using the transition function $\delta$. According to some example embodiments, a DFA may accept a given input string, according to some example embodiments, if and only if the computation of the given input string terminates at an accepting state.

A DFA with additional privacy features may be one example of a query state machine that may be used in accordance with some example embodiments. According to some example embodiments, a query state machine may incorporate a transition function that returns a private filter value that is encrypted, resulting in $C_0$ or $C_1$. As described above, the transition function is defined such that a match results in $C_1$ being used, and a mis-match results in $C_0$ being used. Within the context of a query state machine, if the computation of an input string terminates at an accepting state, then based on the private filter value of the transition function to the accepting state, $C_1$ may be used. Alternatively, if the computation of an input string terminates at a non-accepting state, then based on the private filter value of the transition function to the non-accepting state, $C_0$ may be used.

As such, pattern matching, according to some example embodiments provided herein, may involve using a regular expression search to obtain a private filter value based on the transition function for incorporation into the query state machine. A query state machine may be a modified DFA such that the transition function incorporates the private filter values. Such a modified DFA may be referred to as a privacy-preserving Deterministic Finite Automaton (pDFA), which may be one type of query state machine that is formed to support regular expression searches without revealing the accepting state. Such a pDFA may, according to some example embodiments, include a transition function that accepts an input symbol, emits a next state, and returns a private filter value of $C_1$ if the next state is an accepting state, or return a private filter value of $C_0$ if computation of the input string is complete and the next state is a non-accepting state. A pDFA may be specified by a tuple $\langle T, \Sigma, \delta', t_0, b_0, C\rangle$, where T is a finite set of states, $\Sigma$ is a set of input symbols (e.g., a target query string), C is a set of indistinguishable filters for use with an encryption or encoding function where $|C|=|T|$, $\Gamma'$: $T \times \Sigma \rightarrow \{\langle t, c\rangle : t \in T \wedge c \in C\}$ is the transition and filter retrieval function which returns a next state and a filter c from C as follows:

$$c = \begin{cases} C_1 & \text{if } t \in F \\ C_0 & \text{otherwise} \end{cases}$$

and where F is the set of accepting states, $t_0$ is the initial state, and $b_0=C_0$ is an initial result state. The filter retrieval feature of the transition function may return $C_1$ or $C_0$ depending on whether the final state is an acceptance state. One with skill in the art would appreciate that no explicit designation of accepting states is provided with the pDFA, relative to the DFA structure described above. In this regard, acceptance of an input string may be conveyed cryptographically and returned through the private filter value representing an encryption of a 1 or 0, by the transition function $\delta'$.

As such, a query state machine, possibly in the form of a pDFA, may include a plurality of states, where one of the states is an initial or start state and at least another of the states is an accepting state. The transitions may be employed to indicate (a) a next state based on a next target input symbol of a target input string and (b) a private filter value that indicates whether the next state is an accepting state or a non-accepting state.

Having defined a structure for the query state machine, the following provides a description of creation of a specific query state machine for a given search pattern. In this regard, the data requestor 110 may be configured to encode a regular expression search pattern to produce, for example, a pDFA for the search pattern. The pDFA may be generated by first generating a DFA based on the search pattern and then converting the DFA into a pDFA by incorporating a transition function that returns a private filter value. Methods of creating a DFA are known to one skilled in the art, and involve creating states and transitions for each symbol in the search pattern and every potential symbol in the target query string, then applying a reduction algorithm to combine states into a compact form. In this regard, the pDFA may be created using a transition function $\delta'$ that returns a filter value being an encryption of 1 for each symbol that transitions into an accepting state, and a filter value being an encryption of 0 everywhere else. Accordingly, the data requestor 110 may set $b_0$ to $C_0$ at the outset.

The data repository 120, and more specifically the query executor 130, may run the query state machine in the form of a pDFA on the symbols of a target query string in each target query record of the database 140. To start, the query executor 130 may be configured to initialize a variable $b=b_0$ as the results buffer. As the query executor 130 runs the pDFA, query executor 130 may be configured to assign to b the encoding c returned by $\delta'$. After processing the final symbol in the target query string, b may contain an encoding based on a private filter value $C_1$ if the target query string matches search pattern, or a private filter value of $C_0$ otherwise. The query executor 130 may be configured to continue with application of the pDFA to the target records and associated target query strings of the database 140 and filtering using b.

Figure 2:
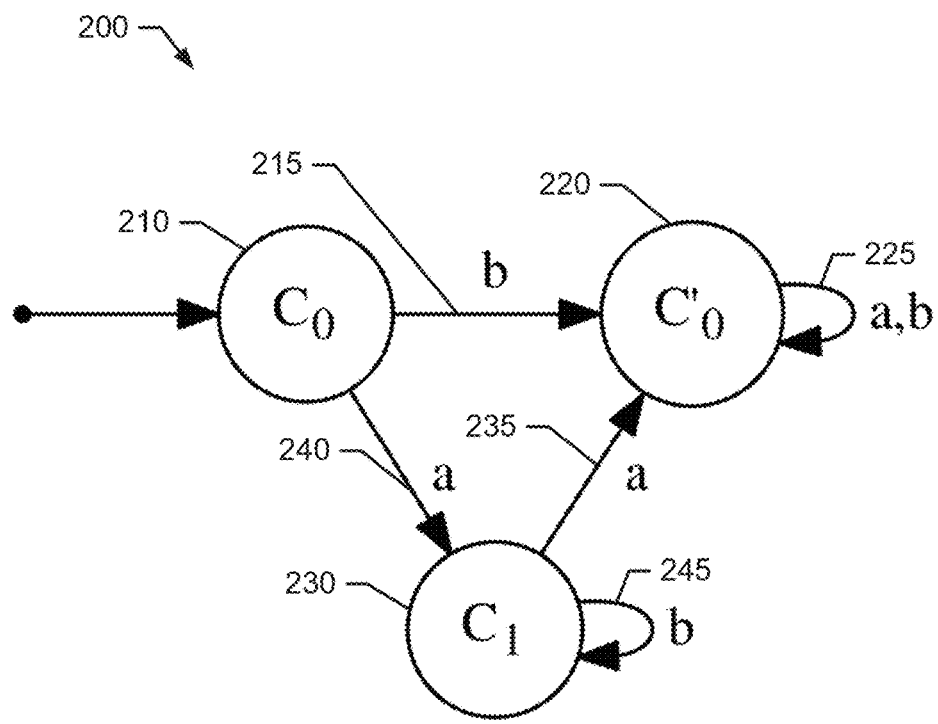
FIG. 2 shows an example encoding of a search pattern in the form of a query state machine according to an example embodiment.
Figure 3:
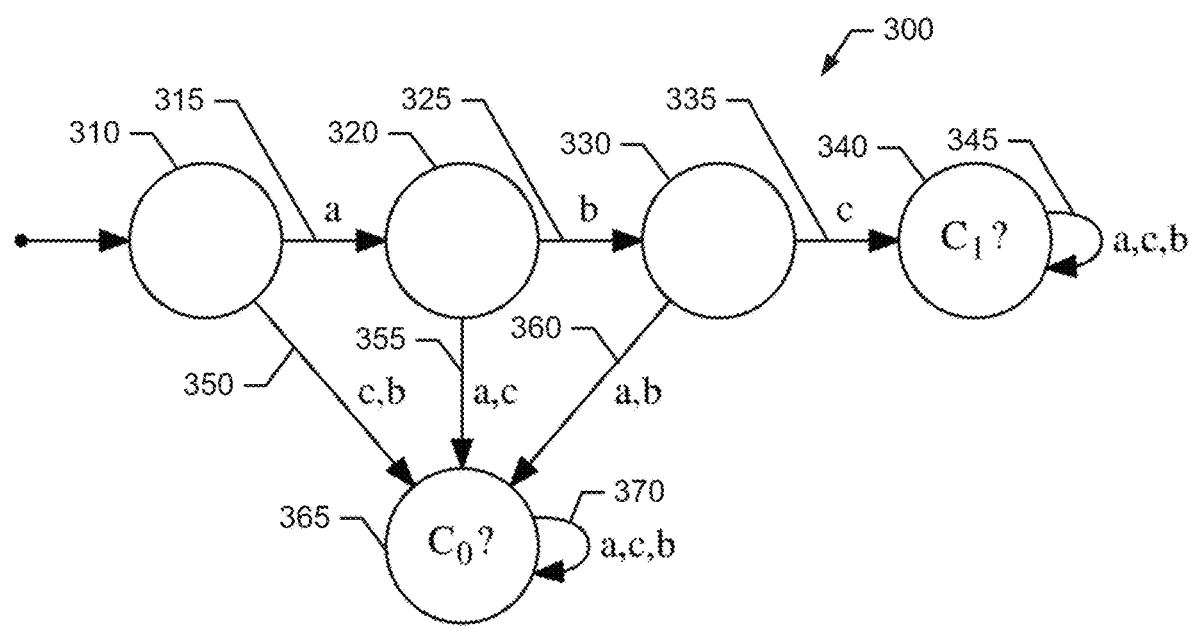
FIG. 3 shows another example query state machine according to an example embodiment.

Based on the foregoing, FIG. 2 shows an example encoding of a query state machine 200 for a search pattern of "ab*" ("a" followed by any number of "b's"). The example query state machine 200 includes three states 210, 220, and 230. State 210 is the starting state as indicated by the open arrow. State 230 is an accepting state and is associated with the private filter value $C_1$, while the other states are not accepting states as indicated by being associated with the private filter value $C_0$ and $C_0'$. While the diagram of the query state machine shows state 230 as an accepting state, this information would not be available to the query executor 130 as described above and otherwise herein. Note also that state 220 may use an alternative encoding of zero (i.e., $C_0'$), which may operate to further prevent the query executor 130 from distinguishing the accepting state from the non-accepting states.

To utilize the query state machine 200, the analysis may begin at the starting state, state 210 where transitions 215 and 240 may be considered. If the first symbol in the target query string is an "a", then the computation would proceed to state 230 via transition 240. If the first symbol in the target query string is a "b", then the computation would proceed to state 220 via transition 215. At state 220, the second symbol in the target query string may be evaluated with respect to the only transition 225, and if the second symbol is either an "a" or a "b" the transition 225 simply returns to state 220. Since state 220 is not an accepting state, and since there is no transition that exits the state 220 (since the universe of non-wildcard symbols in this example is limited to "a" and "b"), it can be determined that any target query string that begins with a "b" is not a match and a private filter value of $C_0'$ will be provided to the results buffer B.

Alternatively, if the first symbol of the target query string is an "a", then further evaluation of the second symbol of the target query string may be conducted at state 230 with respect to transitions 235 and 245. If the second symbol is an "a", the transition 235 moves the computation to state 220 and ultimately $C_0'$ will be provided. As such, a target query string beginning with "aa" will not result in an acceptance. Further, if the second symbol is a "b", then transition 245 returns the analysis to state 230, and if the second symbol is the last symbol in the target query string, then $C_1$ is returned to the results buffer. If the second symbol is not the last symbol, but the target query string only includes "b's" following the initial "a", then ultimately $C_1$ will be returned. As such, the transition 245 introduces a wildcard "*" to the analysis, since any number of following "b's" may be included and still result in an acceptance. However, if at any point, a symbol being an "a" is identified, then the transition 235 controls and moves the evaluation to state 220 and ultimately returns $C_0'$. As such, based on this rather simple query state machine 200, it can be determined that the target query strings that are "ab*" will be accepted and return $C_1$.

Based on this example, the evaluation of a query state machine with respect to a target query string may be generally described as including the following, according to some example embodiments. The query executor 130 may perform the query against the target query string for a target query record in, for example, the database 140 by applying the query state machine to the target query string. In this regard, applying the query state machine to the target query string may comprise sequentially inputting subsequent symbols of the target query string into transitions for a current query state of the query state machine to determine a next query state, and inputting a last symbol of the target query string into a final transition or the target query string to determine a final state of the query state machine for the target query string. Based on the final state, an encoding function result may be provided based on the whether the final state is an accepting state. For example, the encoding function result may be an encoding of zero in response to the final state not being the accepting state or an encoding of one in response to the final state being an accepting state. Further, the encoding function result may be combined in a query results buffer with prior encoding function results for previous target query records. The buffer may be delivered to, for example, the data requestor 110, which may be configured to decrypt the query results buffer to determine whether the search pattern exists in the database 140 and to determine the query result associated with the search pattern.

Unfortunately, as indicated by the reverse analysis that was provided above, the simple query state machine 200 may not sufficiently hide the graph structure of a query. Specifically, query executor 130 may be able to carry out a structural attack against the query state machine 200 by looking at the query graph and observing that certain sequences of symbols transition into "garbage" states, characterized by many inbound transitions and few or no outbound ones. Such garbage states may operate to lessen the privacy of the query state machine by allowing query executor 130 to focus on the states that require sequences of specific symbols to reach.

Further, by using an output buffer return frequency that data requestor 110 may have supplied to the query executor 130 during the query initiation, query executor 130 may be able to guess certain accepting states and use frequency analysis to confirm such a guess. For example, referring to the query state machine 300 of FIG. 3, the query executor 130 may easily recover the search pattern encoded by the query state machine 300.

In this regard, it can be seen that the query state machine 300 includes five states 310, 320, 330, 340, and 365. It can be further deduced that any target query string beginning with "abc" will move via transitions 315, 325, and 335 to state 340 where any further symbols will return back to state 340. However, state 365 is linked to states 310, 320, and 330 via transitions 350, 355, 360, respectively; and transition 370 simply returns back to state 365. As such, state 365 appears to be a candidate for being a garbage state since a variety of symbols cause movement to state 365 and there is no exit to state 365. As such, the search pattern of "abc.*" maybe readily discerned through elimination of the garbage state.

According to some example embodiments, techniques for obfuscating the search pattern may be employed to further increase the privacy of the query state machine. In this regard, various techniques may be utilized either separately or together. Some techniques include (1) regular expression fuzzing and (2) query algorithm expansion.

With respect to regular expression fuzzing, the data requestor 110 may create a regular expression for the search pattern and may then create alternative, false or dummy representations of the search pattern before constructing the query state machine. For example, data requestor 110 may be configured to supplement a search pattern "a[ab]*" with other symbols, producing, for example, "[abc] [abz]" as a result. Such an amended search pattern may still match the same strings as the desired search pattern, but will also match additional strings. A benefit of this approach to obfuscation may be the ease of implementation and a requirement that no modifications are required for creating the query state machine. A possible drawback of the approach may be that introducing the dummy search patterns at such a high level in the query state machine construction may result in the preservation of information about the original structure based solely on the search pattern. As such, according to some example embodiments, further obfuscation of the query state machine may be performed by adding additional states and associated transition functions to the query state machine for dummy search patterns that differ from the search pattern.

Query algorithm expansion or pDFA expansion may involve adding additional states and transitions to the query state machine to increase query executor 130's work factor when attempting to guess the actual search pattern. The expansion algorithm, according to some example embodiments, may thereby enable state-by-state expansion.

Data requestor 110 may be configured to convert a regular expression search pattern into a query state machine, such as, for example, a pDFA. Then, the data requestor 110 may obfuscate the transition function δ' by copying selected states of the query state machine, while preserving the accepting/non-accepting status of the state, and modifying the underlying transitions. For example, the data requestor 110 may be configured to select a state t with an in-degree (i.e., a number of inbound transitions) greater than or equal to 2, and then create a new state t' that has the same acceptance status as t. Since the filter c may indicate acceptance, a new encoding of c' may be made to obscure evidence that t' was expanded from t. The procedure may continue with reassigning at least one incoming transition δ'(u,s)→t to δ'(u,s)→t', for states u and t, and symbol s. Further, all outgoing transitions may be copied δ'(t,s)→w to δ'(t',s)→w for states t and w. The data requestor 110 may repeat this procedure, for example, until all reassignable transitions are exhausted. In other words, the data requestor 110 may be configured to add at least one additional state derived from a selected state of the plurality of states of the query state machine, reassign at least one transition into the selected state to the additional state, and copy at least one transition out of the selected state to the additional state.

According to some example embodiments, the expansion algorithm may rely on the aspect that the private filter values emitted by the query state machine and the transition function of the query state machine may be indistinguishable to the query executor 130, thereby preventing the query executor 130 from identifying the accepting states. Therefore, adding additional states may decrease the probability that the query executor 130 might guess the accepting states. An example of the expansion algorithm in use is shown via the addition of a state to the query state machine 400 in FIG. 4A to the expanded query state machine 401 of FIG. 4B.

Figure 4A:
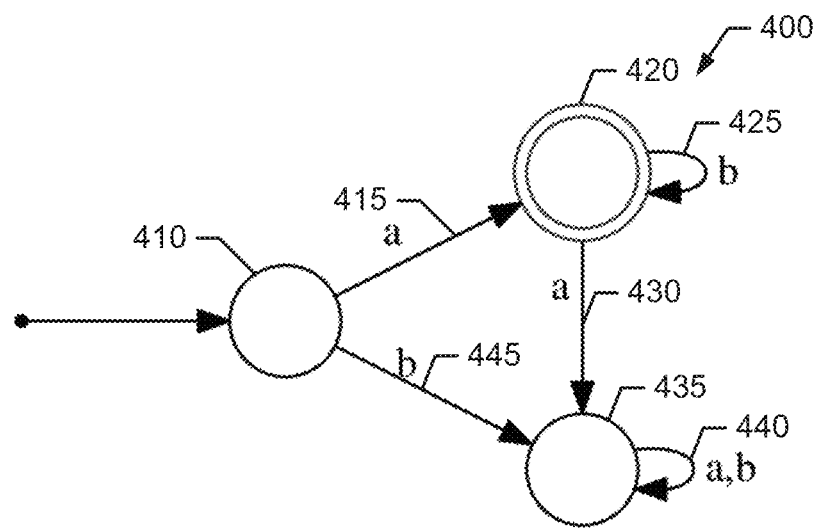
FIG. 4A shows another example query state machine according to an example embodiment.

As shown in FIG. 4A, a query state machine 400 is provided with three states 410, 420, and 435, where 410 is the starting state and 420 is an accepting state. The search pattern for the query state machine 400 is "ab*". Transition 415 moves from state 410 to state 420 if an evaluated symbol is an "a". Transition 430 moves from state 420 to state 435 if an evaluated symbol is an "a". Transition 445 moves from state 410 to state 435 if an evaluated symbol is a "b". Transition 445 moves from state 420 back to state 420 if an evaluated symbol is a "b". Transition 440 moves from state 435 back to state 435 if an evaluated symbol is an "a" or a "b".

Figure 4B:
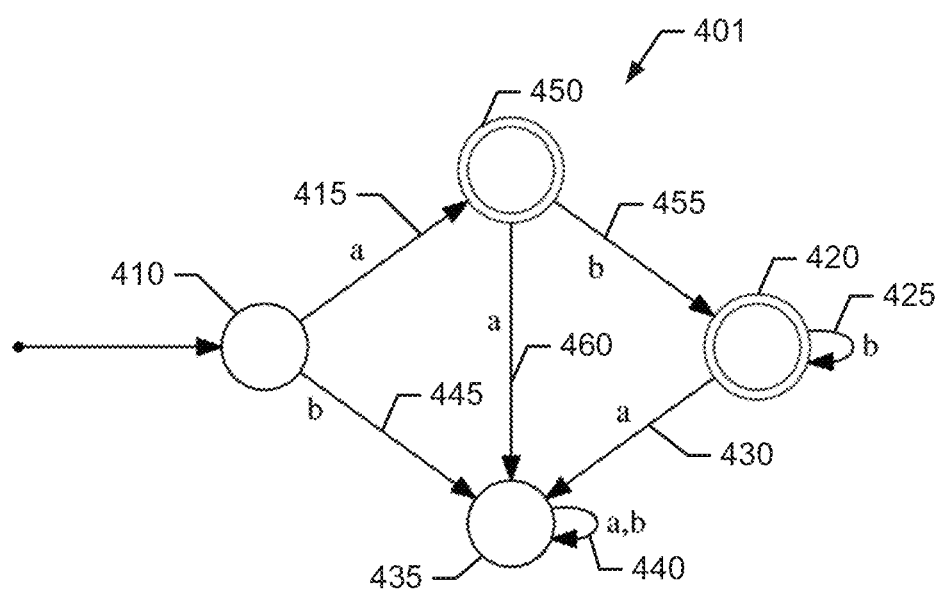
FIG. 4B shows the example query state machine of FIG. 4A with an expanded state according to an example embodiment.

Referring now to FIG. 4B, based on the expansion algorithm provided herein, the query state machine 400 of FIG. 4A may be expanded to be query state machine 401 by adding a new accepting state 450 through expansion of accepting state 420. To do so, the transition 415 may be reassigned to move from state 410 to state 450 if an evaluated symbol is an "a". Transition 425 may then be copied to form transition 455 which moves from state 450 to state 420 if the evaluated symbol is a "b". Additionally, transition 430 may be copied to form transition 460 which moves from state 450 to state 435 if the evaluated symbol is an "a".

An advantage of this approach, according to some example embodiments, is that no false positives are created and more diversity is introduced, relative to, for example, regular expression fuzzing as described above. Further, the expansion algorithm may also require no changes to the input regular expression. A drawback of the approach may be that repeated expansion may result in an increased number of states, each having a private filter value, thereby requiring additional storage and communications bandwidth.

With respect to the overall effectiveness of the expansion technique itself, there may be a possibility that a graph reduction algorithm could be created to reduce a large graph down to a much smaller one, by exploiting the inherent, fractal-like repeating structures of the expanded nodes that are formed. To address this potential issue, according to some example embodiments, a Somewhat Homomorphic Encryption (SHE) approach may be used.

In consideration of the query state machine 400 of FIG. 4A, an example query state machine is provided that represents a prefix matching regular expression "ab*", where the significant, non-wildcard symbols appear at the start of the search pattern. According to some example embodiments, with prefix matching expressions, the strings accepted by the language must terminate on specific characters. Here, the character is "b". As seen in the query state machine 400, for example, any trailing characters that are not the specific character cause the associated state machine to enter a set of garbage states from which execution never exits.

Figure 4C:
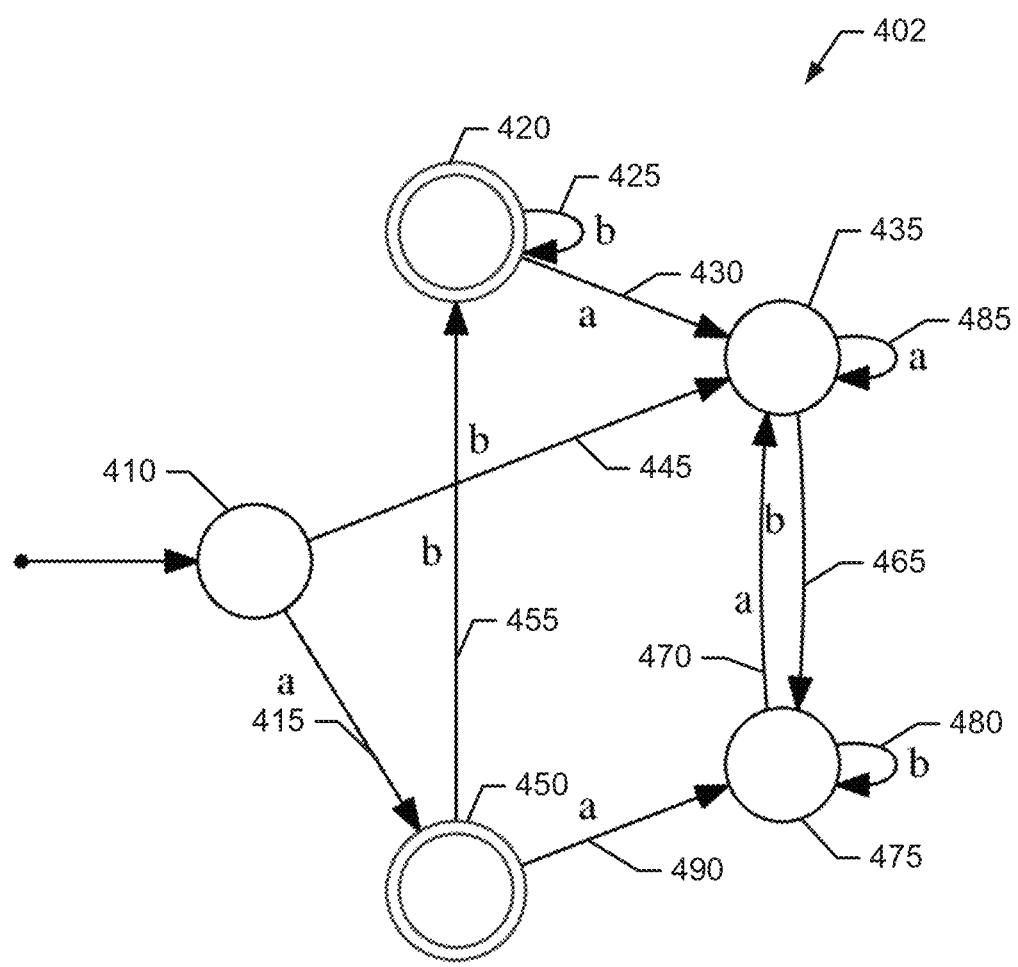
FIG. 4C shows the example query state machine of FIG. 4B with an additional expanded state according to an example embodiment.

Referring now to FIG. 4C, a query state machine 402 derived from query state machine 401 may be formed. Expanding the prefix matching query state machine 401 may result in generation of query state machine 402, where a set of garbage states y (or a garbage node) can be identified as a set of states that have no transitions back out of the set of states.

To obtain the query state machine 402 via expansion, state 435 may be expanded into new state 475. In this regard, transition 440 may be reassigned to form transition 465 that moves from state 435 to state 475 if the evaluated symbol is a "b". Additionally, transition 460 may be reassigned to form transition 490 that moves from state 450 to state 475 if the evaluated symbol is an "a". Further, transition 440 may be copied to form transition 480 for evaluating a symbol that is a "b" and transition function 485 for evaluating a symbol that is an "a". Further, transition function 470 may be copied from transition function 440 for evaluating a symbol that is an "a".

Figure 4D:
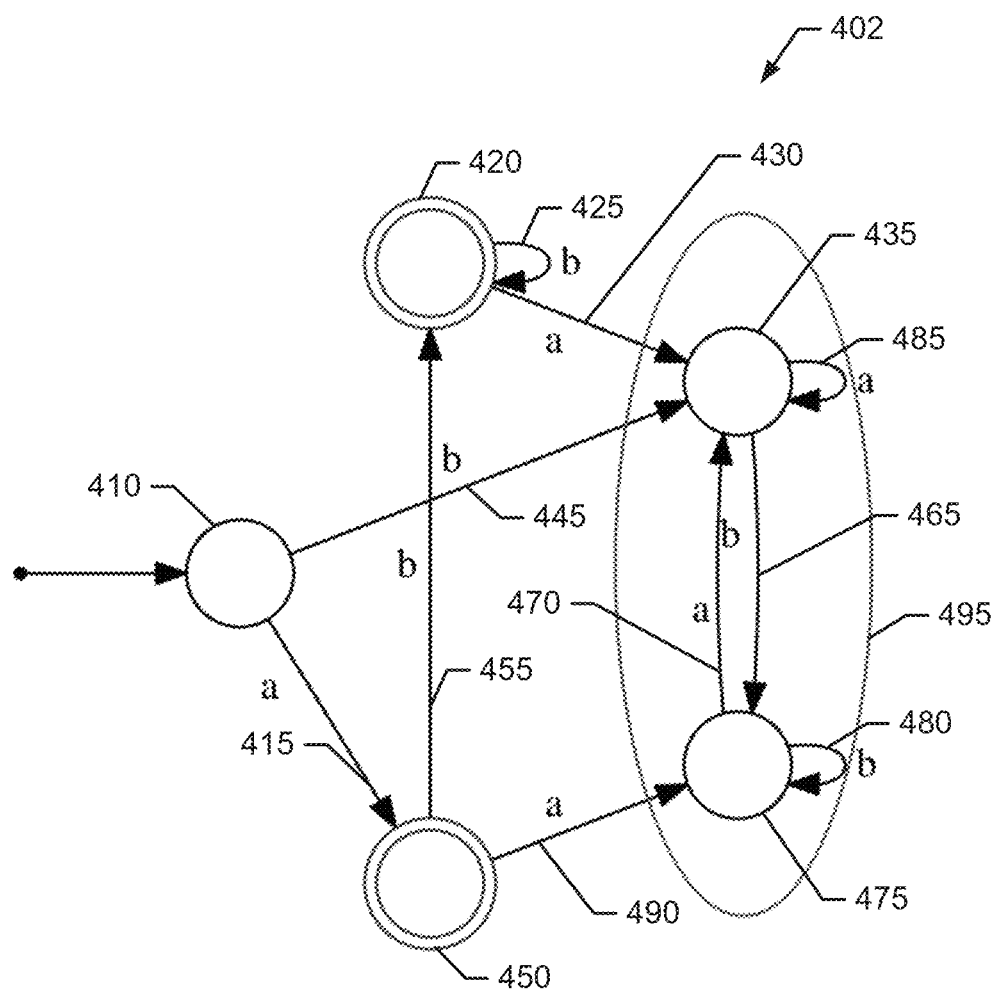
FIG. 4D shows the example query state machine of FIG. 4C with identified garbage states according to an example embodiment.

FIG. 4D shows query state machine 402 with an identified set of garbage states based on the expansion described above. It can be determined that the states 435 and 475 form a set of garbage states or a garbage node 495. According to some example embodiments, this type of problem, also referred to as a quotient reduction problem, may affect regular expression search patterns that the constitute prefix patterns that have significant (non-wildcard) symbols that occur at the start of the string (e.g., "ab.*"), and infix patterns that have significant (non-wildcard) symbols that occur in the middle of the string (e.g., ".*ab.*"). Suffix patterns, i.e., those that match symbols at the end of a string, may not suffer from this problem because the state cursor may transit a cluster of accepting nodes up to the end of input.

To address the issue raised by, for example, the existence of the garbage node 495, the data requestor 110 may be configured to create additional fake exit transition functions out of the garbage node 495 back into other states in such a way that the resulting private filter value does not indicate a selection of the string, even if the state cursor ends on an accepting state. In this regard, a modified traversal method may first be described followed by a description of the cryptosystem requirements.

Accordingly, an example approach may involve a change to how the query executor 130 traverses the query state machine and the manner of obtaining the filter value. In this regard, the process of query algorithm creation may be modified. Further, after creating the query state machine in the form of, for example, a pDFA, the data requestor 110 may be configured to identify all paths that lead to accepting terminal states and set the transitions to return a private filter value of $C_1$ for each link in every accepting path. The data requestor may be configured to then assign $C_0$ to all other links. Additionally, the data requestor 110 may assign a filter value of $C_1$ to each accepting terminal state, and $C_0$ to the non-accepting states.

At the query executor 130, the traversal process may also be altered. In this regard, the query executor 130 may be configured to traverse the query state machine for each symbol in the target query string, and build a set of all links traversed along with their associated filter values. At the end of a complete traversal for a given target query string, the query executor 130 may be configured to multiply the accumulated filter values $C_x$ from the links with the filter value for $C_x$ assigned to the ending state, and store the encoding function result for the record in the results buffer. According to some example embodiments, an additive operation may be used when including the encoding function result in the results buffer. Following this same approach, data requestor 110 may continue to operate in the same manner while moving through the records by updating the results buffer.

Because the traversal results may be multiplicative, adding fake transition functions may involve merely reassigning some transitions within the garbage node to point back to non-garbage node states, and setting the private filter values for the reassigned transitions to $C_0$. The addition of the reassigned transitions may have no effect on the results buffer during traversal because the multiplication of $C_0$ causes the output filter to equal $C_0$. Thus, according to some example embodiments, garbage nodes may be addressed by the data requestor 110 by identifying a subset of states that have no transition functions indicating an exit from the subset of states, and adding at least one exit transition from the subset of states to a select state that is not a member of the subset of states.

Figure 4E:
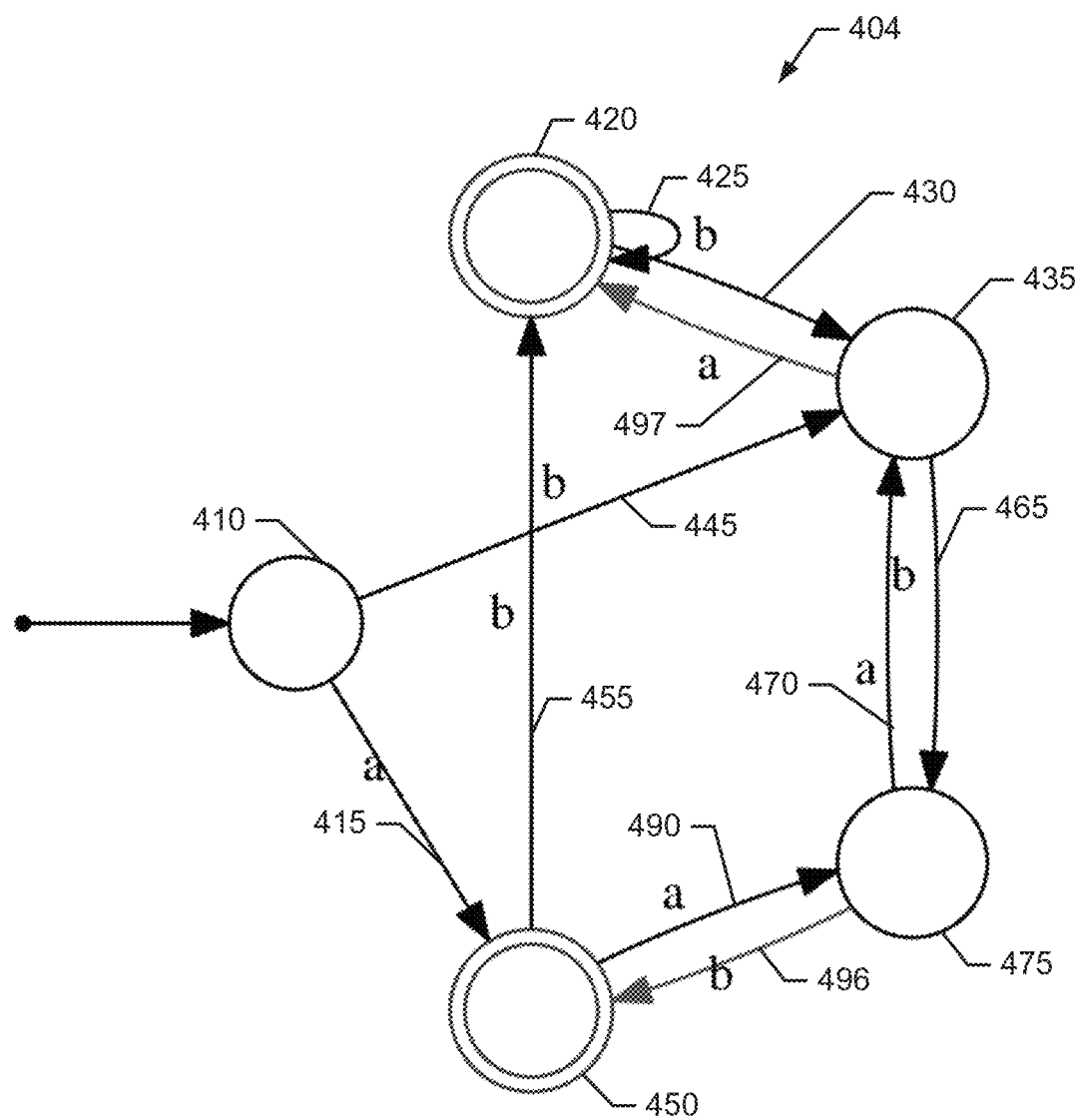
FIG. 4E shows the example query state machine of FIG. 4D with added fake links to prior garbage states according to an example embodiment.

An example reassignment of transitions to non-garbage node states can be seen in the query state machine 404 of FIG. 4E, where transitions 496 and 497 are introduced. In the query state machine 404, the garbage node 495 can be eliminated by adding fake exit links via transitions 496 and 497, which are reassigned versions of transition functions 480 and 485, respectively. In this regard, by moving these transitions, and the associated filter $C_0$ with the functions, the query executor 130 may no longer be able to identify the garbage states and therefore may not be able to simplify the query state machine 404 in an effort to determine the search pattern. This change, from a cryptographic perspective, involves a transition from a partially homomorphic cryptosystem to using a Somewhat Homomorphic Encryption (SHE) system. The multiplicative homomorphic property during query state machine traversal can continue to be leveraged to determine the filter value. Further, as different records are considered, the results buffer may be updated with associated results using an additive property.

Figure 5:
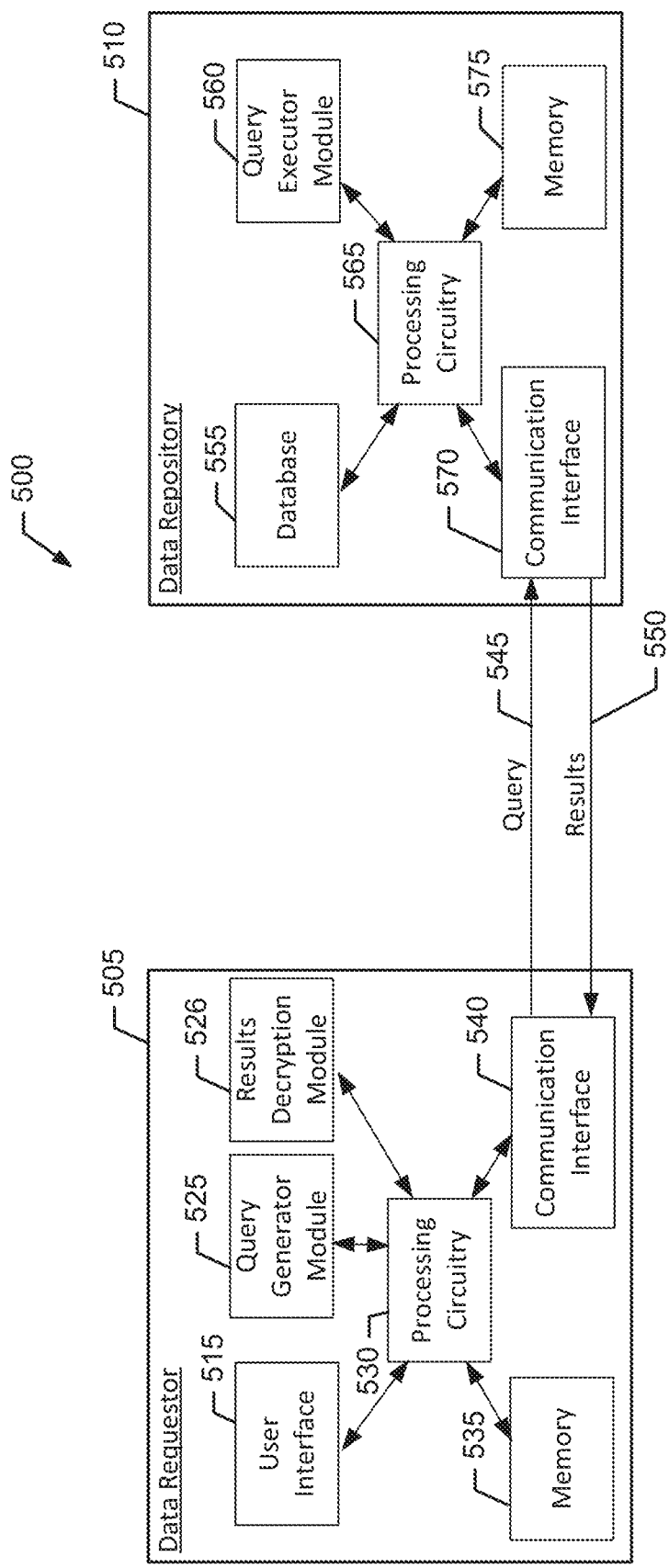
FIG. 5 shows a block diagram of a query generating device and a query executing device according to an example embodiment.

FIG. 5 provides a more detailed example of a system 505 for private information retrieval according to some example embodiments. The system 505 may operate in the same or similar manner as the system 100 of FIG. 1A. In this regard, the data requestor 505 may operate in the same or similar manner as the data requestor 110, and the data repository 510 may operate in the same or similar manner as the data repository 120. Additionally, query 545 may be same or similar to query 160 and results 550 may be the same or similar to the results 170.

Accordingly, FIG. 5 shows block diagrams of some internal components of the data requestor 505 and the data repository 510, both of which may be computer systems. Beginning with the data requestor 505, the data requestor 505 may comprise processing circuitry 530 in operable communication with an user interface 515, a query generator module 525, a results decryption module 526, a memory 535, and a communication interface 540. In particular, the query generator module 525 and the results decryption module 526 may include or otherwise be in communication with processing circuitry 530 that is configurable to perform actions in accordance with example embodiments described herein including the actions described with respect to data requestor 110.

The processing circuitry 530 may be configured to perform data processing, control function execution or other processing and management services according to an example embodiment. In some embodiments, the processing circuitry 530 may be embodied as a chip or chip set. In other words, the processing circuitry 530 may comprise one or more physical packages (e.g., chips) including materials, components or wires on a structural assembly (e.g., a baseboard). The processing circuitry 530 may be configured to receive inputs (e.g., via peripheral components including the memory 535, perform actions based on the inputs, and generate outputs (e.g., for provision to peripheral components).

In an example embodiment, the processing circuitry 530 may include one or more instances of a processor, associated circuitry, and memory 535. The processing circuitry may be in communication with or otherwise control user interface 515 and communication interface 540. As such, the processing circuitry 530 may be embodied as a circuit chip (e.g., an integrated circuit chip) configured (e.g., with hardware, software or a combination of hardware and software) to perform operations described herein.

The communication interface 540 may include one or more interface mechanisms for enabling communication with other devices, such as the data repository 510 to send the query 545 and receive the results 550. In some cases, the communication interface 540 may be any means such as a device or circuitry embodied in either hardware, or a combination of hardware and software that is configured to receive or transmit data from/to devices in communication with the processing circuitry 530.

The user interface 515 may include one or more interface mechanisms (e.g., keyboard, touch screen, mouse, monitor, or the like) for enabling users to input and interface with data (e.g., a search pattern) to be operated upon by the processing circuitry 530. In some cases, the user interface 515 may be any means such as a device or circuitry embodied in either hardware, or a combination of hardware and software that is configured to receive and provide data to the processing circuitry 530 to perform various functionalities as provided herein. Further, in some cases, the user interface 515 may be any means such as a device or circuitry embodied in either hardware, or a combination of hardware and software that is configured to output data to a user as provided by the processing circuitry 530 to perform various functionalities as provided herein.

In an exemplary embodiment, the memory 535 may include one or more non-transitory memory devices such as, for example, volatile or non-volatile memory that may be either fixed or removable. The memory 535 may be configured to store information, data, applications, instructions or the like for enabling the query generator module 525 and the results decryption module 526 to carry out various functions in accordance with exemplary embodiments of the present invention. For example, the memory 535 could be configured to buffer input data for processing by the processor circuitry 530. Additionally or alternatively, the memory 535 could be configured to store instructions for execution by the processing circuitry 530. Among the contents of the memory 535, applications may be stored for execution by the processing circuitry 530 in order to carry out the functionality associated with each respective application. In some cases, the applications may include directions associated with the query generator module 525 and the results decryption module 526.

The processing circuitry 530 may be embodied in a number of different ways. For example, the processing circuitry 530 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processing circuitry 530 may be configured to execute instructions stored in the memory 535 or otherwise accessible to the processing circuitry 530. As such, whether configured by hardware or by a combination of hardware and software, the processing circuitry 530 may represent an entity (e.g., physically embodied in circuitry—in the form of processing circuitry 530) capable of performing operations according to embodiments of the present invention while configured accordingly. Thus, for example, when the processing circuitry 530 is embodied as an ASIC, FPGA or the like, the processing circuitry 530 may be specifically configured hardware for conducting the operations described herein. Alternatively, as another example, when the processing circuitry 530 is embodied as an executor of software instructions, the instructions may specifically configure the processing circuitry 530 to perform the operations described herein.

In an example embodiment, the processing circuitry 530 may be embodied as, include or otherwise control the query generator module 525 and the results decryption module 526. As such, in some embodiments, the processing circuitry 530 may be said to cause each of the operations described in connection with the query generator module 525 and the results decryption module 526 to undertake the corresponding functionalities responsive to execution of instructions or algorithms configuring the processing circuitry 530 accordingly. For example, the processing circuitry 530 may provide programmable control signals, selections, and the like to control the operation of the data requestor 505 in accordance with the query generator module 525 and the results decryption module 526 responsive to execution of instructions stored in the memory 535.

The query generator module 525 may be embodied in hardware of the processing circuitry 530 or embodied in the hardware of the processing circuitry as configured by instructions stored in the memory 535. In this regard, the query generator module 525 may be configured to receive a search pattern, for example via the user interface 515. The search pattern may be received via the user interface 515 from, for example, a data requesting entity to search for and retrieve data at the data repository 510 in a manner that maintains privacy of the search pattern from the data repository 510 while permitting the data repository 510 to return results corresponding to a private query created from the search pattern and return a query result to the data requestor 505. The query generator module 525 may be further configured to encode the search pattern to form a query state machine based on the search pattern. The query state machine may include a plurality of states and a transition function that defines a plurality of transitions based on the search pattern. Further, the plurality of states may include an initial state and an accepting state. Each transition may indicate (a) a next state based on a next target symbol from a target string and (b) a private filter value that indicates whether the next state is an accepting state or a non-accepting state. Further, according to some example embodiments, the query generator module 525 may be configured to transmit, via the communication interface 540, the query state machine to the data repository 510.

According to some example embodiments, the query generator module 525 may be configured to encode the search pattern to form the query state machine where the query state machine comprises a Deterministic Finite Automaton (DFA). Further, according to some example embodiments, the search pattern may include at least one wildcard symbol to match target strings that have an unbounded length. Further, according to some example embodiments, the query generator module 525 may be configured to encode the search pattern, where encoding the search pattern includes adding additional states and associated transitions to the query state machine for dummy search patterns that differ from the search pattern. According to some example embodiments, the query generator module 525 may be configured to encode the search pattern, where encoding the search pattern includes adding an additional state derived from a selected state of the plurality of states, reassigning at least one transition into the selected state to the additional state, and copying at least one transition out of the selected state to the additional state. The query generator module 525 may, according to some example embodiments, also be configured to encode the search pattern, where encoding the search pattern includes identifying a subset of states that have no transitions indicating an exit from the subset of states, and adding at least one exit transition from the subset of states to a select state that is not a member of the subset of states.

The results decryption module 526 may be embodied in hardware of the processing circuitry 530 or embodied in the hardware of the processing circuitry as configured by instructions stored in the memory 535. In this regard, the results decryption module 526 may be configured to decrypt a query results buffer received from the data repository 510 in the results 550. The decrypting may be performed to retrieve any target data of a target query record that has been included in a private encoding of the query results buffer.

With respect to the data repository 510, the data repository 510 may comprise processing circuitry 565 in operable communication with a database 555, a query executor module 560, a memory 575, and a communication interface 570. In particular, the query executor module 560 may include or otherwise be in communication with processing circuitry 565 that is configurable to perform actions in accordance with example embodiments described herein including the actions described with respect to data repository 120 and the query executor 130.

The processing circuitry 565 may be configured to perform data processing, control function execution or other processing and management services according to an example embodiment. In some embodiments, the processing circuitry 565 may be embodied as a chip or chip set. In other words, the processing circuitry 565 may comprise one or more physical packages (e.g., chips) including materials, components or wires on a structural assembly (e.g., a baseboard). The processing circuitry 565 may be configured to receive inputs (e.g., via peripheral components including the memory 575, perform actions based on the inputs, and generate outputs (e.g., for provision to peripheral components).

In an example embodiment, the processing circuitry 565 may include one or more instances of a processor, associated circuitry, and memory 575. The processing circuitry may be in communication with or otherwise control database 555 and communication interface 570. As such, the processing circuitry 565 may be embodied as a circuit chip (e.g., an integrated circuit chip) configured (e.g., with hardware, software or a combination of hardware and software) to perform operations described herein.

The communication interface 570 may include one or more interface mechanisms for enabling communication with other devices, such as the data requestor 505 to receive the query 545 and send the results 550. In some cases, the communication interface 570 may be any means such as a device or circuitry embodied in either hardware, or a combination of hardware and software that is configured to receive or transmit data from/to devices in communication with the processing circuitry 565.

The database 555 may be a collection of data records stored on a tangible memory device and accessible for reading or writing by the processing circuitry 565. According to some example embodiments, the database 555 may be remote from the processing circuitry 565 and may be accessible to the processing circuitry 565 via the communication interface 570. Via the processing circuitry 565, the query executor module 560 may be configured to query the records in the database 555.

In an exemplary embodiment, the memory 575 may include one or more non-transitory memory devices such as, for example, volatile or non-volatile memory that may be either fixed or removable. The memory 575 may be configured to store information, data, applications, instructions or the like for enabling the query executor module 560 to carry out various functions in accordance with exemplary embodiments of the present invention. For example, the memory 575 could be configured to buffer input data for processing by the processor circuitry 565. Additionally or alternatively, the memory 575 could be configured to store instructions for execution by the processing circuitry 565. Additionally or alternatively, some or all of the memory 575 may be allocated to be a results buffer that is used and operates in the same manner as the results buffer B 135. Among the contents of the memory 575, applications may be stored for execution by the processing circuitry 565 in order to carry out the functionality associated with each respective application. In some cases, the applications may include directions associated with the query executor module 560.

The processing circuitry 565 may be embodied in a number of different ways. For example, the processing circuitry 565 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processing circuitry 565 may be configured to execute instructions stored in the memory 575 or otherwise accessible to the processing circuitry 565. As such, whether configured by hardware or by a combination of hardware and software, the processing circuitry 565 may represent an entity (e.g., physically embodied in circuitry—in the form of processing circuitry 565) capable of performing operations according to embodiments of the present invention while configured accordingly. Thus, for example, when the processing circuitry 565 is embodied as an ASIC, FPGA or the like, the processing circuitry 565 may be specifically configured hardware for conducting the operations described herein. Alternatively, as another example, when the processing circuitry 565 is embodied as an executor of software instructions, the instructions may specifically configure the processing circuitry 565 to perform the operations described herein.

In an example embodiment, the processing circuitry 565 may be embodied as, include or otherwise control the query executor module 560. As such, in some embodiments, the processing circuitry 565 may be said to cause each of the operations described in connection with the query executor module 560 to undertake the corresponding functionalities responsive to execution of instructions or algorithms configuring the processing circuitry 565 accordingly. For example, the processing circuitry 565 may provide programmable control signals, selections, and the like to control the operation of the data repository 510 in accordance with the query executor module 560 responsive to execution of instructions stored in the memory 575.

The query executor module 560 may be embodied in hardware of the processing circuitry 565 or embodied in the hardware of the processing circuitry as configured by instructions stored in the memory 575. In this regard, the query executor module 560 may be configured to perform a private query, based on the content of the query 545, against a target query string of a target query record in the database 555 by applying a query state machine to the target query string. In this regard, according to some example embodiments, the query executor module 560 may be configured to sequentially input subsequent symbols of the target query string into the transition function for a current query state of the query state machine to determine a next query state. The query executor module 560 may be further configured to input a last symbol of the target query string into the transition function for the target query string to determine a final state of the query state machine for the target query string, and to obtain a private filter value for the final state. Additionally, the query executor module 560 may be configured to generate a private encoding based on the private filter value of the final state. In this regard, the private encoding may be based on target data retrieved from the target query record in response to the private filter value indicating that the final state is an accepting state. Additionally, the private encoding may be based on an empty record in response to the private filter value indicating that the final state is a non-accepting state. According to some example embodiments, the query executor module 560 may be further configured to combine the private encoding in a query results buffer with previous private encodings.

Figure 6:
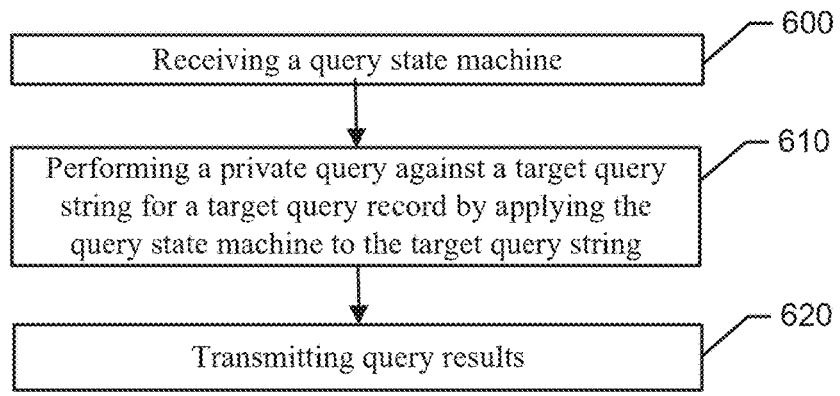
FIG. 6 shows a flow chart of a method for conducting private information retrieval according to an example embodiment.

Referring now to FIG. 6, a block diagram of an example method for private information retrieval, as implemented by the system 100 or the system 500, and more particularly the query executor 130 or data repository 510. In this regard, an example method for conducting private information retrieval is provided. The example method may, at 600, comprise receiving, at a data repository computer system, a query state machine from a data requesting computer system. The query state machine may be an encoding of a search pattern and the query state machine may include a plurality of states and a transition function that defines a plurality of transitions based on the search pattern. The plurality of states may include an initial state and one or more accepting states, and each transition of the transition function may indicate (a) a next state based on an input symbol and (b) a private filter value for the next state based on whether the next state is an accepting state or a non-accepting state.

The example method may also include, at 610, performing a private query against a target query string of a target query record in the data repository computer system by applying the query state machine to the target query string. Applying the query state machine to the target query string may comprise generating a private encoding using a private filter value of a final state of the query state machine for the target query string. The final state may be determined by a traversal through the query state machine based on the target query string. The private encoding may be based on target data retrieved from the target query record in response to the final state being an accepting state. The method may further include, at 620, transmitting query results based on the private encoding.

According to some example embodiments, performing the private query may further comprise, prior to generating the private encoding, sequentially inputting subsequent symbols of the target query string into the transition function to determine a next query state, and inputting a last symbol of the target query string into the transition function to determine the final state of the query state machine for the target query string and to obtain the private filter value for the final state. According to some example embodiments, performing the private query may further comprise combining the private encoding in a query results buffer with previous private encodings. According to some example embodiments, combining the private encoding may comprise using a multiplicative operation. According to some example embodiments, the query state machine may comprise a Deterministic Finite Automaton (DFA). According to some example embodiments, the target query string has an unbounded length or the search pattern includes at least one wildcard symbol. Further, according to some example embodiments, the query state machine may comprise additional states and associated transitions associated with dummy search patterns that differ from the search pattern. The query state machine may also, according to some example embodiments, comprise an additional state derived from a selected state of the plurality of states, the additional state having at least one reassigned transition into the selected state to the additional state and at least one copied transition into the additional state from the selected state. According to some example embodiments, the query state machine does not include a subset of states that have no transitions into states that are not members of the subset of states, wherein the subset of states includes at least two states.

Figure 7:
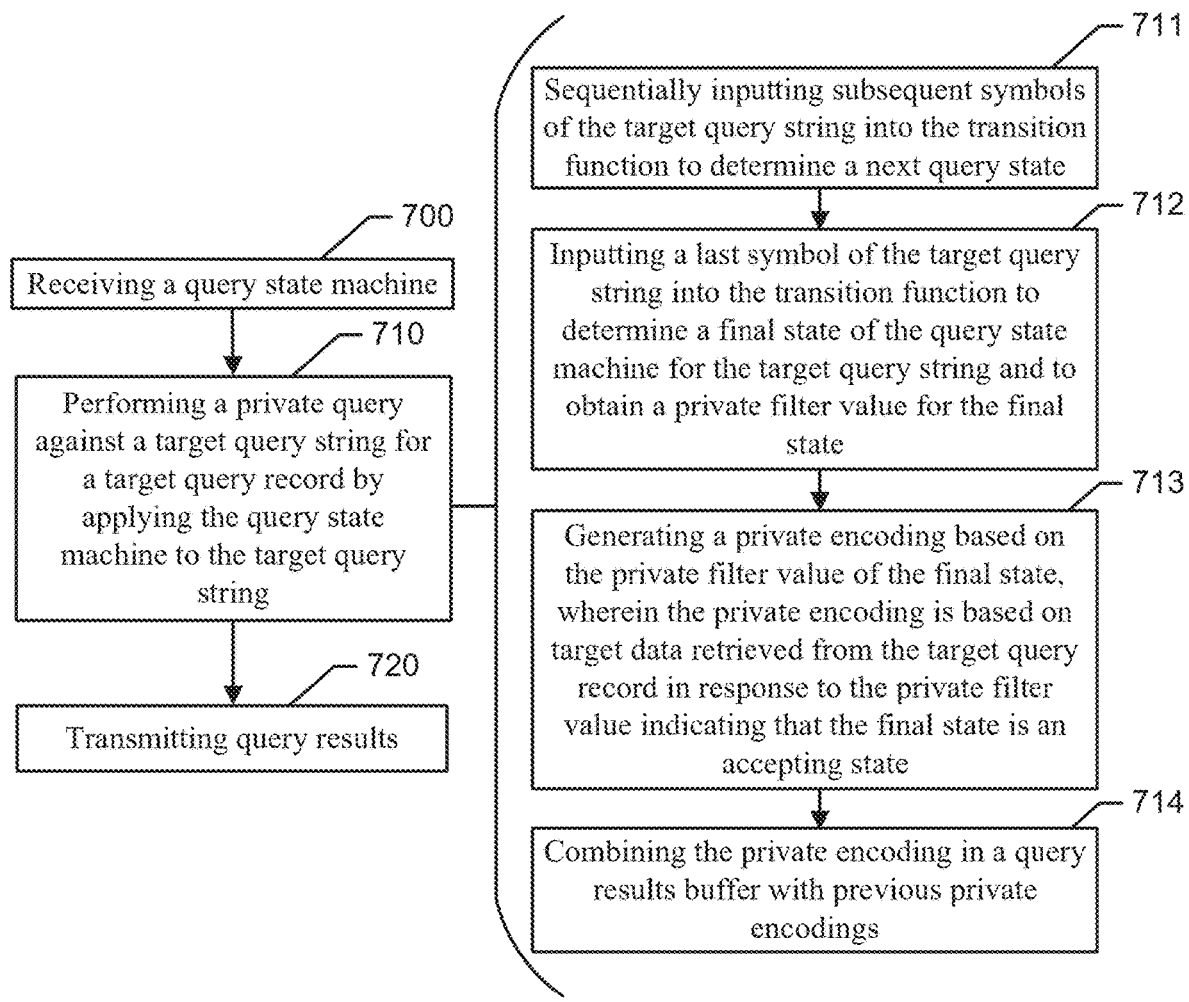
FIG. 7 shows a flow chart of a method for conducting private information query according to an example embodiment.

Referring now to FIG. 7, a block diagram of an example method for private information retrieval, as implemented by the system 100 or the system 500, and more particularly the query executor 130 or data repository 510. The example method may comprise, 700, receiving, at a data repository computer system, a query state machine from a data requesting computer system. The query state machine may be an encoding of a search pattern provided to the data requesting computer system. In this regard, the search pattern may be provided to the data requesting computer system by a data requesting entity to search for and retrieve data at the data repository computer system in a manner that maintains privacy of the search pattern. The query state machine may include a plurality of states and a transition function that defines a plurality of transitions based on the search pattern. The plurality of states may include an initial state and one or more accepting states, and each transition may indicate (a) a next state based on an input symbol and (b) a private filter value for the next state based on whether the next state is an accepting state or a non-accepting state.

At 710, the example method may comprise performing a private query against a target query string of a target query record in the data repository computer system by applying the query state machine to the target query string. In this regard, applying the query state machine to the target query string may comprise, at 711, sequentially inputting subsequent symbols of the target query string into the transition function to determine a next query state, at 712, inputting a last symbol of the target query string into the transition function to determine a final state of the query state machine for the target query string and to obtain a private filter value for the final state, at 713, generating a private encoding based on the private filter value of the final state, wherein the private encoding is based on target data retrieved from the target query record in response to the private filter value indicating that the final state is an accepting state, and, at 714, combining the private encoding in a query results buffer with previous private encodings. Further, the example method may comprise, at 720, transmitting the query results buffer to the data requesting computer system for decrypting the query results buffer, at the data requesting computer system, to retrieve any target data of a target query record that has been included in a private encoding.

According to some example embodiments, receiving the query state machine may include receiving the query state machine comprising a Deterministic Finite Automaton (DFA). Further, the search pattern includes at least one wildcard symbol.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such example is described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the invention set forth herein will come to mind to one skilled in the art having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for conducting private information retrieval comprising:
    receiving, at a data repository computer system, a query state machine from a data requesting computer system, wherein the query state machine is an encoding of a search pattern, wherein the query state machine includes a plurality of states and a transition function that defines a plurality of transitions based on the search pattern, wherein the plurality of states includes an initial state and one or more accepting states, and wherein each transition of the transition function outputs (a) a next state based on an input symbol and (b) a private filter value, the private filter value being an encryption of a plaintext value, the private filter value being a first private filter value if the next state is an accepting state or a second private filter value if the next state is a non-accepting state, the first private filter value being different from the second private filter value;
    performing a private query against a target query string of a target query record in the data repository computer system by applying the query state machine to the target query string, wherein applying the query state machine to the target query string comprises determining that the private filter value for a final state of the query state machine for the target query string is the first private filter value or the second private filter value and generating a private encoding by applying the private filter value of the final state of the query state machine for the target query string to the target query string, the final state being determined by a traversal through the query state machine based on the target query string, wherein the private encoding is based on target data retrieved from the target query record in response to the final state being an accepting state; and
    transmitting, to the data requesting computer system, a results buffer comprising a plurality of private encodings and respective private filter values for the query state machine, the plurality of private encodings and the respective private filter values comprising the private encoding and the private filter value of the final state of the query state machine for the target query string.

2. The method of claim 1, wherein performing the private query further comprises, prior to generating the private encoding:
    sequentially inputting subsequent symbols of the target query string into the transition function to determine a next query state; and
    inputting a last symbol of the target query string into the transition function to determine the final state of the query state machine for the target query string and to obtain the private filter value for the final state.

3. The method of claim 1, wherein performing the private query further comprises combining the private encoding in the results buffer with previous private encodings; and
    wherein combining the private encoding comprises using a multiplicative operation.

4. The method of claim 1, wherein the query state machine comprises a Deterministic Finite Automaton (DFA); and
    wherein applying the private filter value of the final state of the query state machine for the target query string to the target query string is a homomorphic operation.

5. The method of claim 1, wherein the target query string has an unbounded length.

6. The method of claim 1, wherein the search pattern includes at least one wildcard symbol.

7. The method of claim 1, wherein the query state machine comprises additional states and associated transitions associated with dummy search patterns that differ from the search pattern.

8. The method of claim 1, wherein the query state machine comprises an additional state derived from a selected state of the plurality of states, the additional state having at least one reassigned transition into the selected state to the additional state and at least one copied transition into the additional state from the selected state.

9. The method of claim 1, wherein the query state machine does not include a subset of states that have no transitions into states that are not members of the subset of states, wherein the subset of states includes at least two states.

10. The method of claim 1, wherein the results buffer is a fixed size buffer that is transmitted to the data requesting computer system periodically after being updated with new private encodings and respective private filter values.

11. The method of claim 1, wherein generating the private encoding comprises generating the private encoding, as a first homomorphic operation on the target query string, by applying the private filter value of the final state of the query state machine for the target query string to the target query string; and
    wherein the method further comprises combining the private encoding via a second homomorphic operation to update the results buffer.

12. An apparatus for performing private information retrieval comprising:
    a data repository computer system comprising:
        at least one processor; and
        at least one memory, wherein the at least one processor, using the at least one memory, is configured to:
receive a query state machine from a data requesting computer system, wherein the query state machine is an encoding of a search pattern, wherein the query state machine includes a plurality of states and a transition function that defines a plurality of transitions based on the search pattern, wherein the plurality of states includes an initial state and one or more accepting states, and wherein each transition of the transition function outputs (a) a next state based on an input symbol and (b) a private filter value, the private filter value being an encryption of a plaintext value, the private filter value first private filter value if the next state is an accepting state or a second private filter value if the next state is a non-accepting state, the first private filter value being different from the second private filter value;
perform a private query against a target query string of a target query record in the data repository computer system by applying the query state machine to the target query string, wherein being configured to apply the query state machine comprises being configured to determine that the private filter value for a final state of the query state machine for the target query string is the first private filter value or the second private filter value and generate a private encoding by applying the a private filter value of the final state of the query state machine for the target query string to the target query string, the final state being determined by a traversal through the query state machine based on the target query string, wherein the private encoding is based on target data retrieved from the target query record in response to the final state being an accepting state; and
transmit, to the data requesting computer system, a results buffer comprising a plurality of private encodings and respective private filter values for the query state machine, the plurality of private encodings and the respective private filter values comprising the private encoding and the private filter value of the final state of the query state machine for the target query string.

13. The apparatus of claim 12, wherein the at least one processor configured to perform the private query is further configured to:
sequentially input subsequent symbols of the target query string into the transition function to determine a next query state; and
input a last symbol of the target query string into the transition function to determine the final state of the query state machine for the target query string and to obtain the private filter value for the final state.

14. The apparatus of claim 12, wherein the at least one processor configured to perform the private query is further configured to combine the private encoding in the results buffer with previous private encodings; and
wherein the at least one processor is further configured to combine the private encoding using a multiplicative operation.

15. The apparatus of claim 12, wherein the query state machine comprises a Deterministic Finite Automaton (DFA).

16. The apparatus of claim 12, wherein the target query string has an unbounded length.

17. The apparatus of claim 12, wherein the search pattern includes at least one wildcard symbol.

18. A method for performing private information retrieval comprising:
receiving, at a data repository computer system, a query state machine from a data requesting computer system, wherein the query state machine is an encoding of a search pattern provided to the data requesting computer system, wherein the search pattern is provided to the data requesting computer system by a data requesting entity to search for and retrieve data at the data repository computer system in a manner that maintains privacy of the search pattern, wherein the query state machine includes a plurality of states and a transition function that defines a plurality of transitions based on the search pattern, wherein the plurality of states includes an initial state and one or more accepting states, and wherein each transition outputs (a) a next state based on an input symbol and (b) a private filter value, the private filter value being an encryption of a plaintext value, the private filter value being a first private filter value if the next state is an accepting state or a second private filter value if the next state is a non-accepting state, the first private filter value being different from the second private filter value;
performing a private query against a target query string of a target query record in the data repository computer system by applying the query state machine to the target query string, wherein applying the query state machine to the target query string comprises:
sequentially inputting subsequent symbols of the target query string into the transition function to determine a next query state;
inputting a last symbol of the target query string into the transition function to determine a final state of the query state machine for the target query string;
determining that the private filter value for the final state of the query state machine for the target query string is the first private filter value or the second private filter value;
generating a private encoding by applying the private filter value of the final state of the query state machine for the target query string to the target query string, wherein the private encoding is based on target data retrieved from the target query record in response to determining that the final state is an accepting state;
combining the private encoding in a query results buffer with previous private encodings; and
transmitting the query results buffer to the data requesting computer system for decrypting the query results buffer, at the data requesting computer system, to retrieve any target data of a target query record that has been included in the private encoding, the query results buffer comprising a plurality of private encodings and respective private filter values for the query state machine, the plurality of private encodings and the respective private filter values comprising the private encoding and the private filter value of the final state of the query state machine for the target query string.

19. The method of claim 18, wherein receiving the query state machine includes receiving the query state machine comprising a Deterministic Finite Automaton (DFA).

20. The method of claim 18, wherein the search pattern includes at least one wildcard symbol.

\* \* \* \* \*